(No Model.)

W. DECKER.
DYNAMO ELECTRIC MACHINE.

No. 473,547. Patented Apr. 26, 1892.

WITNESSES:
Frank S. Ober
James F. Kavanagh

INVENTOR:
Ward Decker.
BY
W. J. Johnston
ATTORNEY.

THE NORRIS PETERS CO., PHOTO-LITHO., WASHINGTON, D. C.

UNITED STATES PATENT OFFICE.

WARD DECKER, OF OWEGO, NEW YORK.

DYNAMO-ELECTRIC MACHINE.

SPECIFICATION forming part of Letters Patent No. 473,547, dated April 26, 1892.

Application filed November 25, 1891. Serial No. 413,063. (No model.)

*To all whom it may concern:*

Be it known that I, WARD DECKER, a citizen of the United States, residing in Owego, county of Tioga, and State of New York, have invented certain new and useful Improvements in Dynamo-Electric Machines, of which the following is a specification.

My invention relates especially to the winding of armatures for multipolar dynamos and motors, the object being to avoid complication in the cross-connecting of the coils and the commutator, thereby simplifying the machine, lowering the cost of manufacture, rendering it easy to make repairs, and to produce an armature for multipolar machines in which but two wires or coils are connected in multiple at a time, thereby avoiding the evil effects of heating due to unbalanced fields.

The invention consists in the details hereinafter described and claimed.

Figure 1:
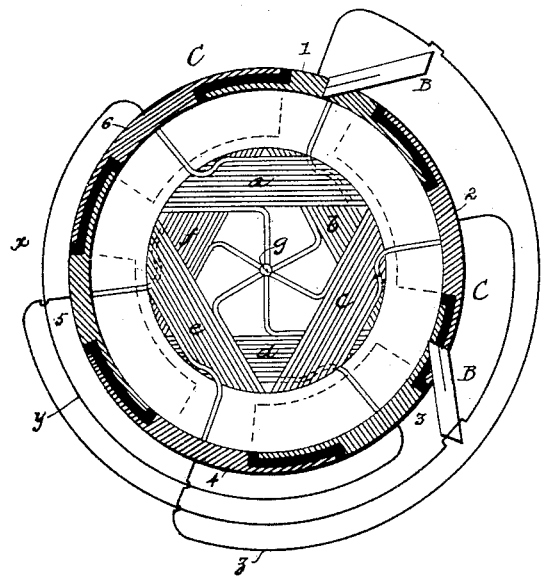
Figure 2:
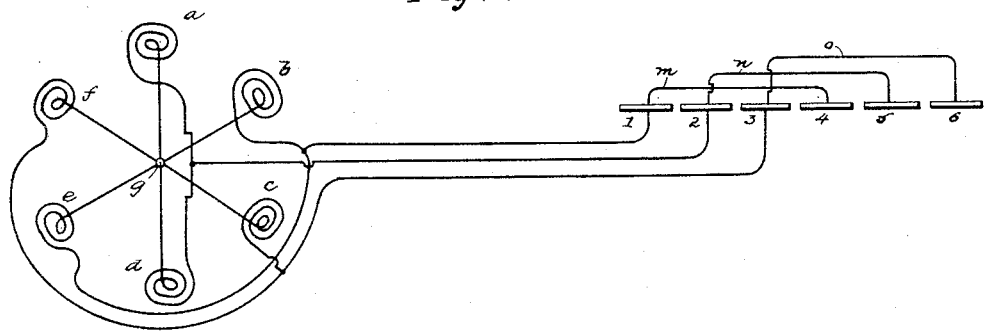

In the drawings, Figure 1 represents diagrammatically the end of an armature and a commutator with the brushes and connections of a four-pole machine, and Fig. 2 shows a slight difference in the connections.

The armature shown is of the drum-type; but my invention is not confined to that type, as a ring may be utilized. For a four-pole machine I use six coils, $a$, $b$, $c$, $d$, $e$, and $f$, each one of which is wound flat upon the armature and extends over one hundred and twenty degrees of its circumference.

The commutator C is in six sections, 1, 2, 3, 4, 5, and 6, the adjacent segments overlapping each other for one-third of their length. The brushes B are two in number and impinge upon the commutator at points ninety degrees apart.

The connections are as follows: The inner ends of the coils are all connected together, as at $g$, while the outer ends are connected, respectively, to the sections of the commutator. Those coils, which stand diametrically opposite each other on the armature, are connected, respectively, to sections of the commutator which are diametrically opposite each other and located in radial planes, which vary with the planes of the coils to which they are connected as the line of commutation for those coils varies.

The opposite sections of the commutator are cross-connected by the conductors $x$, $y$, and $z$, so that it is necessary that there should be only three connections between the armature and the commutator, as illustrated by $m$, $n$, and $o$ in Fig. 2, the other connections being made between the coils at the armature.

The operation and direction of the current in the coils is the same as in all multipolar machines, one brush is drawing from two coils while the other is drawing from four, this condition reversing as each segment is passed.

Having thus described my invention, I claim—

1. In a multipolar dynamo-electric machine, the combination, with a series of armature-coils, all electrically connected together at one end, of a cross-connected commutator the sections of which are connected, respectively, with the opposite or free ends of the coils, for the purpose set forth.

2. In a multipolar dynamo-electric machine, the combination, with a series of armature-coils, all electrically connected together at one end, of a cross-connected commutator, the adjacent sections of which overlap each other, the sections being connected, respectively, with the opposite or free ends of the coils, substantially as described.

In witness whereof I have hereunto affixed my seal and signed my name in the presence of two subscribing witnesses.

WARD DECKER. [L. S.]

Witnesses:
FRED G. HORTON,
F. C. HILL.